United States Patent

[11] 3,620,971

[72] Inventor Oliver Plumbar
 Port Arthur, Tex.
[21] Appl. No. 66,148
[22] Filed Aug. 21, 1970
[45] Patented Nov. 16, 1971
[73] Assignee Gulf Oil Corporation
 Pittsburgh, Pa.

[54] BREAKING REFINERY SEWER OIL AND WATER EMULSIONS WITH SODIUM BICARBONATE
 6 Claims, No Drawings

[52] U.S. Cl...................................................... 210/59,
 252/330
[51] Int. Cl........................................................ C02c 5/02

[50] Field of Search............................................ 210/59, 42,
 56; 252/329, 330

[56] References Cited
UNITED STATES PATENTS

| | | | |
|---|---|---|---|
| 2,074,183 | 3/1937 | Hershman .................... | 252/329 |
| 1,223,659 | 4/1917 | Barnickel ..................... | 252/330 |

Primary Examiner—Michael Rogers
Attorneys—Meyer Neishloss, Deane E. Keith and Alvin E. Ring ABSTRACT: Refinery sewer system emulsions containing oil, water and sediment are broken by the use of sodium bicarbonate.

BREAKING REFINERY SEWER OIL AND WATER EMULSIONS WITH SODIUM BICARBONATE

This invention relates to a process for breaking oil and water emulsions and more particularly to a process for breaking oil, water and solid emulsions recovered from refinery sewer systems.

The process of the present invention comprises adding sodium bicarbonate to an emulsion or a pretreated emulsion that has been recovered from a refinery sewer system and is extremely difficult to break by conventional means. After the sodium bicarbonate has been added to the emulsion, the sodium bicarbonate containing emulsion is heated to a temperature of between about 170° F. and 210° F. The heated and treated emulsion is then placed into a tank or other suitable settling vessel where it is allowed to separate into layers of oil, water and solid materials. When sodium bicarbonate is employed in accordance with the present invention, three separate and distinct layers occur after settling and are easily separated. The clear oil and water produced by this process is returned to the refinery to be further processed or utilized and the solid material is disposed of or utilized as land fill.

The water pollution problem created by the disposal of oil and water emulsions which occur in refinery sewer systems is of concern regarding pollution abatement at petroleum refineries. In order to dispose of these emulsions, the emulsion must first be broken into its separate components of oil and water. The emulsion occurring in refinery sewer systems is particularly difficult to handle because of the wide variety of compounds that are contained in the emulsions. The use of a variety of processing techniques and an increasing variety of chemicals in refining operations results in stable and difficult to break emulsions in the refinery sewer system. The emulsions occurring in refinery sewer systems are in fact made up of so many components and varying quantities of components that they are difficult, if not impossible, to characterize, and the reason for their stability is not fully understood. One factor that does appear to contribute to the stability of the emulsions and to the difficulty of their disposal is solid materials contained in these emulsions. Techniques employed in the past have broken the emulsions containing solid materials but the solid materials for the most part remain suspended in the aqueous phase of the composition and further treatment of the aqueous phase is required to separate the solid materials before the water is reuseable or can be returned to the fresh water supply. It is a particular advantage of this invention that the emulsion breaks into three distinct phases; one containing oil, one containing water and one containing the bulk of the solid materials.

It is well known to use sodium hydroxide or spent caustic to break refinery sewer emulsions; however, these compounds in themselves are pollutants and must be removed from the aqueous phase or neutralized before the water is free of contamination. In addition, it has been found that the use of sodium hydroxide or spent caustic does not give the satisfactory results obtained by using sodium bicarbonate. The results obtained by employing sodium bicarbonate have a high degree of repeatability.

Spent "doctor" solution is also a known emulsion breaking agent, but it suffers from the same disadvantage as the caustic in that lead sulfide and other lead compounds contained are known pollutants.

It has been known in the past to treat refinery sewer emulsions with sodium carbonate; however, the results of certain tests discussed below show that sodium carbonate is not as effective as sodium bicarbonate when treating emulsions containing a relatively high proportion of basic sediment and water (BS & W). In the past, treating emulsions containing a high percentage of basic sediment and water was not entirely explored as these emulsions were returned to fresh water streams. This was so because, in the past, emulsions were treated primarily to recover the oil that they contained and not for the purpose of abating pollution. As pollution controls become more stringent the use of sodium bicarbonate for breaking these emulsions becomes particularly advantageous. It is known that an aqueous solution of sodium bicarbonate slowly breaks down when heated to relatively high temperatures to form sodium carbonate and water with the evolution of carbon dioxide, and it might have been expected that sodium bicarbonate and sodium carbonate would be equivalents. However, the following data show that when sodium bicarbonate is employed in the present invention it is not equivalent to sodium carbonate. These data are as follows:

| Test No. | Emulsion characteristics | | Treatment grams/liter | | Percent contained oil recovered | |
|---|---|---|---|---|---|---|
| | ° API | Percent BS&W | $NAHCO_3$ | $NA_2CO_3$ | $NAHCO_3$ | $NA_2CO_3$ |
| 1 | 16.7 | 40 | 0.52 | 0.52 | 48 | 47 |
| 2 | 16.7 | 40 | 13.2 | 13.2 | 51 | 43 |
| 3 | 12.7 | 70 | 0.52 | 0.52 | 11 | 6 |
| 4 | 12.7 | 70 | 13.2 | 13.2 | 22 | 12 |
| 5 | 12.5 | 80 | 1.6 | 1.9 | 10 | 0 |
| 6 | 12.5 | 80 | 28.0 | 29.0 | 17 | 2 |
| 7 | 10.4 | 70 | 1.6 | 1.9 | 12 | 6 |
| 8 | 10.4 | 70 | 28.0 | 29.0 | 17 | 6 |

The above tests demonstrate the significant advantage realized by employing sodium bicarbonate in place of sodium carbonate to break a refinery sewer system emulsion. The tests were conducted in sets: tests 1 and 2, test 3 and 4, tests 5 and 6, and tests 7 and 8, wherein each set comprised the same sample of emulsion. The emulsion for each set was obtained by removing a sample of emulsion from different levels of a tank containing a refinery sewer emulsion. The emulsion in the tank was that emulsion which remained after the total refinery sewer stream had been heated and allowed to settle. The stable emulsion sample was then analyzed to determine its API gravity and its basic sediment and water content. The basic sediment and water content analysis was made in accordance with API standard: 2542–ASTM D96, adopted in 1963. All references to basic sediment and water (BS & W) are intended to refer to BS & W content determined by the foregoing standard test method. Tests 1 and 2 demonstrate that sodium bicarbonate is superior to sodium carbonate, particularly when higher dosage levels are employed. Tests 3, 4, 7 and 8 demonstrate that at the 70 percent BS & W level sodium bicarbonate is approximately twice as effective as sodium carbonate. At the 80 percent BS & W content level, as demonstrated by tests 5 and 6, the difference in results is outstanding in favor of sodium bicarbonate.

The present invention can be applied to the treatment of emulsions having low BS & W contents, such as 10 percent. However, the above data show that recovery of oil from emulsions containing more than 40 percent of BS & W is especially difficult and it is in the treatment of the such high BS & W emulsions, that the superiority of sodium bicarbonate over sodium carbonate is most conspicuous. Therefore, the present invention applies especially to the treatment of emulsions having a BS & W content between about 40 and 99 percent, generally and between 60 and 90 percent, particularly.

The present invention does not reside in controlling the pH of the emulsion. It is apparent that pH control is not critical because sodium bicarbonate acts as a buffer and the pH of the emulsion is not materially changed by addition of sodium bicarbonate. The quantity of sodium bicarbonate employed does appear to be a factor in determining how completely the emulsion is broken. The preferred quantity is above 0.1 pound per barrel of emulsion and preferably above two pounds per barrel of emulsion. Greater quantities such as 5 pounds per barrel or more, can be employed. The upper limit of sodium bicarbonate per barrel of emulsion is dictated only by economics.

The following is a summary of results obtained on commercial size batches of emulsion. The emulsion was obtained from a refinery sewer system settling tank and was that emulsion that remained after the fresh sewer system emulsion was heated and allowed to settle. This emulsion is commonly referred to as a middle layer emulsion. In all three runs the emulsion was heated to the indicated temperature, no sodium bicarbonate was employed in run 1 but in runs 2 and 3 sodium bicarbonate was added to the emulsion in the indicated quantity prior to heating. The results are as follows:

| Run No. | 1 | 2 | 3 |
|---|---|---|---|
| Temperature of Treat: °F. | 185–210 | 185–210 | 185–210 |
| Settling Time: Hrs. | 168 | 168 | 113 |
| Charge | | | |
| Middle Layer Emulsion | | | |
| Gravity: °API | 16–19 | 16–19 | 13.6–17.8 |
| BS & W: Percent | 50.0 | 10.4 | 44.0 |
| Oil Content: Percent | 50.0 | 89.6 | 56.0 |
| Bicarbonate of Soda | | | |
| Lbs. | 0 | 15,000 | 15,000 |
| Lbs./Bbl. charge | 0 | 4.8 | 4.6 |
| Yield | | | |
| Oil | | | |
| Percent of Oil Content of Charge | 0 | 79.1 | 99.7 |
| Gravity: °API | | 34.4 | 30.7 |
| BS & W: Percent | | 3.0 | 0.9 |

I claim:

1. A process for breaking refinery sewer oil, water and solid emulsions containing from about 40 to 99 percent basic sediment and water as determined by American Petroleum Institute Test No. 2542 which comprises adding to said emulsions sodium bicarbonate to form a treated emulsion, heating said treated emulsion, and allowing the heated and treated emulsion to separate into separate oil, water and solid layers.

2. The process of claim 1 wherein said treated emulsion is heated to a temperature of from about 170° F. to about 210° F.

3. The process of claim 1 wherein said sodium bicarbonate is added in a quantity of more than 2 pounds per barrel of said emulsion.

4. The process of claim 1 wherein said sodium bicarbonate is added to the emulsion so that the quantity of the sodium bicarbonate in the treated emulsion is between about 2 to about 5 pounds per barrel of said emulsion.

5. A process for breaking refinery sewer oil, water and solid emulsions which are removed from refinery sewer system settling tanks containing from about 40 to 99 percent basic sediment and water as determined by American Petroleum Institute Test No. 2542, said emulsions being those emulsions which remain after subjecting the refinery sewer system effluent to heating and settling, which comprises adding to the emulsion sodium bicarbonate to form a treated emulsion, heating said treated emulsion, and allowing the heated and treated emulsion to separate into separate oil, water and solid layers.

6. A process for breaking a refinery sewer oil, water and solid emulsion containing from about 60 to 90 percent basic sediment and water as determined by American Petroleum Institute Test No. 2542, which comprises adding to the emulsion sodium bicarbonate to form a treated emulsion, heating said treated emulsion, and allowing the heated and treated emulsion to separate into separate oil, water and solid layers.

* * * * *

PO-1050
(5/69)

UNITED STATES PATENT OFFICE
CERTIFICATE OF CORRECTION

Patent No. 3,620,971          Dated   November 16, 1971

Inventor(s) Oliver Plumbar

It is certified that error appears in the above-identified patent and that said Letters Patent are hereby corrected as shown below:

COLUMN 2, TABLE, LINE 23, NEXT TO THE LAST COLUMN, LAST LINE, "17" SHOULD READ --14-- .

Signed and sealed this 23rd day of May 1972.

(SEAL)
Attest:

EDWARD M. FLETCHER, JR.          ROBERT GOTTSCHALK
Attesting Officer                Commissioner of Patents